US012591466B2

(12) United States Patent　　(10) Patent No.:　US 12,591,466 B2
Kuperman　　(45) Date of Patent:　Mar. 31, 2026

(54) UNDERPROVISIONING IN CONTAINERIZED ENVIRONMENTS

(71) Applicant: CAST AI Group, Inc., Miami, FL (US)

(72) Inventor: Leonid Kuperman, North York (CA)

(73) Assignee: CAST AI Group, Inc., Miami, FL (US)

( * ) Notice: Subject to any disclaimer, the term of this patent is extended or adjusted under 35 U.S.C. 154(b) by 0 days.

(21) Appl. No.: 18/972,692

(22) Filed: Dec. 6, 2024

(65) Prior Publication Data

US 2026/0044390 A1　　Feb. 12, 2026

Related U.S. Application Data

(60) Provisional application No. 63/681,519, filed on Aug. 9, 2024, provisional application No. 63/688,979, filed on Aug. 30, 2024, provisional application No. 63/693,521, filed on Sep. 11, 2024.

(51) Int. Cl.
G06F 9/50　　(2006.01)
(52) U.S. Cl.
CPC ................................. G06F 9/5088 (2013.01)
(58) Field of Classification Search
CPC .................................................... G06F 9/5088
See application file for complete search history.

(56) References Cited

U.S. PATENT DOCUMENTS

| | | | |
|---|---|---|---|
| 11,595,306 B2 | 2/2023 | Masnauskas et al. | |
| 2021/0406035 A1* | 12/2021 | Price ................... | G06F 11/3055 |
| 2022/0141201 A1* | 5/2022 | Lal ...................... | H04L 63/1475 |
| 2023/0350730 A1* | 11/2023 | Son ......................... | G06F 11/30 |
| 2024/0069998 A1* | 2/2024 | Chatterjee ............. | G06F 9/5027 |
| 2024/0220307 A1* | 7/2024 | Parikh ................. | G06F 9/45558 |
| 2024/0250997 A1* | 7/2024 | Lahiri ..................... | H04L 63/20 |
| 2024/0419506 A1* | 12/2024 | Mohana Narayanamurthy .......... G06F 9/505 | |

\* cited by examiner

*Primary Examiner* — Sisley N Kim
(74) *Attorney, Agent, or Firm* — Davis Wright Tremaine LLP

(57) ABSTRACT

A system or a method for optimizing resource allocation in a cloud computing environment. The system determines an amount of resource to be allocated for a container workload at an under-provisioned level and schedules the workload onto a node among a plurality of nodes that has the determined amount of resource. Performance metrics of the nodes are continuously monitored to determine whether each of the plurality of nodes is busy. Responsive to determining that the node is busy, the system cordons the node by updating the node's metadata to prevent scheduling new workloads while allowing existing workloads to continue running. In some embodiments, container workloads may be evicted from the cordoned node and migrated to another node with sufficient resources.

20 Claims, 11 Drawing Sheets

Figure 3:
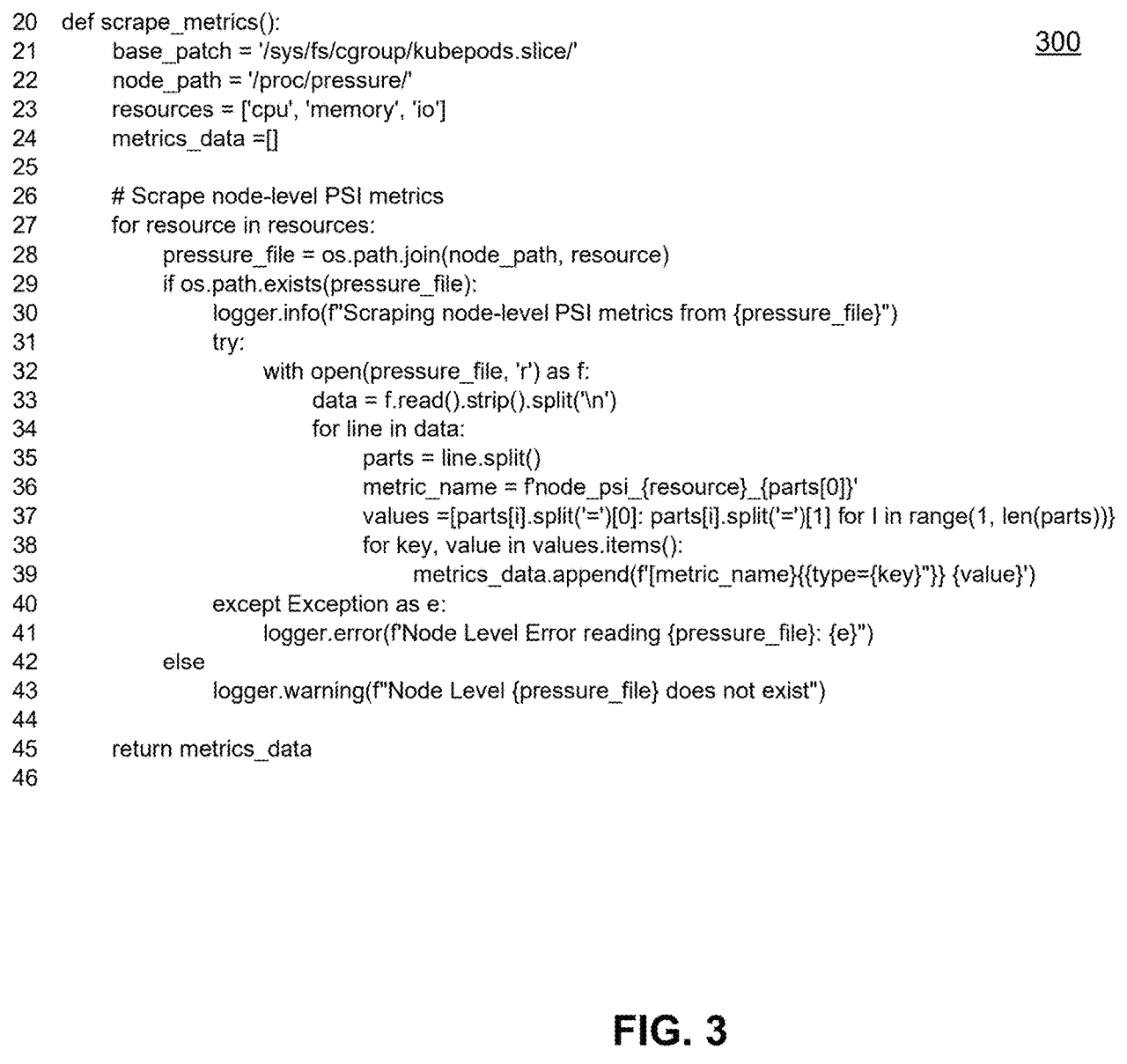

300

```
20   def scrape_metrics():
21       base_patch = '/sys/fs/cgroup/kubepods.slice/'
22       node_path = '/proc/pressure/'
23       resources = ['cpu', 'memory', 'io']
24       metrics_data =[]
25
26       # Scrape node-level PSI metrics
27       for resource in resources:
28           pressure_file = os.path.join(node_path, resource)
29           if os.path.exists(pressure_file):
30               logger.info(f"Scraping node-level PSI metrics from {pressure_file}")
31               try:
32                   with open(pressure_file, 'r') as f:
33                       data = f.read().strip().split('\n')
34                       for line in data:
35                           parts = line.split()
36                           metric_name = f"node_psi_{resource}_{parts[0]}"
37                           values =[parts[i].split('=')[0]: parts[i].split('=')[1] for i in range(1, len(parts))]
38                           for key, value in values.items():
39                               metrics_data.append(f"{metric_name}{{type={key}"}} {value}")
40               except Exception as e:
41                   logger.error(f"Node Level Error reading {pressure_file}: {e}")
42           else:
43               logger.warning(f"Node Level {pressure_file} does not exist")
44
45       return metrics_data
46
```

Kubernetes Nodes Utilization

800

| Node | CPU Capacity | Memory Capacity | Status | Total Pods | Actual CPU Usage |
|---|---|---|---|---|---|
| glk-lk-busy-move-cluster-cast-pool-xxxxxxx | 4 | 16002Mi | | 16 | 32% |
| gke-lk-busy-move-cluster-default-pool-xxxxxxxx-xxxx | 2 | 7950Mi | Not Busy | 32 | 89% |
| gke-lk-busy-move-cluster-default-pool-xxxxxxxx-xxxx | 2 | 7950Mi | Not Busy | 30 | 56% |
| gke-lk-busy-move-cluster-default-pool-xxxxxxxx-xxxx | 2 | 7950Mi | Not Busy | 26 | 45% |

*Instructions*

| Key | Action |
|---|---|
| Up Arrow / Right Arrow | Scroll up through nodes |
| Down Arrow / Left Arrow | Scroll down through nodes |
| r | Refresh data |
| q | Quit |

Pods

| Pod Name | Namespace | CPU Requests | Memory Requests | Actual CPU Usage |
|---|---|---|---|---|
| fluentbit-gke-xxxxxx | kube-system | 5m | 30Mi | 88% |
| collector-xxxxxx | gmp-system | 4m | 32Mi | 87% |
| pdcsi-node-xxxxxx | kube-system | 5m | 10Mi | 84% |
| psi-metrics-exporter-xxxxxx | monitoring | 0 | 0Mi | 75% |
| gke-metrics-agent-xxxxxx | kube-system | 3m | 40Mi | 68% |
| castai-spot-handler-xxxxxx | castai-agent | 20m | 25Mi | 59% |
| collector-xxxxxx | gmp-system | 1m | 4Mi | 55% |
| perf-test-app-xxxxxxxxxxx-xxxxxx | perf-test-ns | 500m | 1200Mi | 47% |
| gke-metrics-agent-xxxxxx | kube-system | 6m | 70Mi | 45% |
| gke-metrics-agent-xxxxxx | kube-system | 10m | 45Mi | 43% |
| fluentbit-gke-lpb8p | kube-system | 50m | 100Mi | 27% |
| pdcsi-node-t59lm | kube-system | 5m | 10Mi | 20% |
| prometheus-operator-prometheus-node-exporter-xxxxxx | monitoring | 0 | 0Mi | 13% |
| fluentbit-gke-lpb8p | kube-system | 50m | 100Mi | 11% |
| kube-proxy-gke-lk-busy-move-cluster-cast-pool-xxxxxxxx | kube system | 100m | Not Set | 6% |

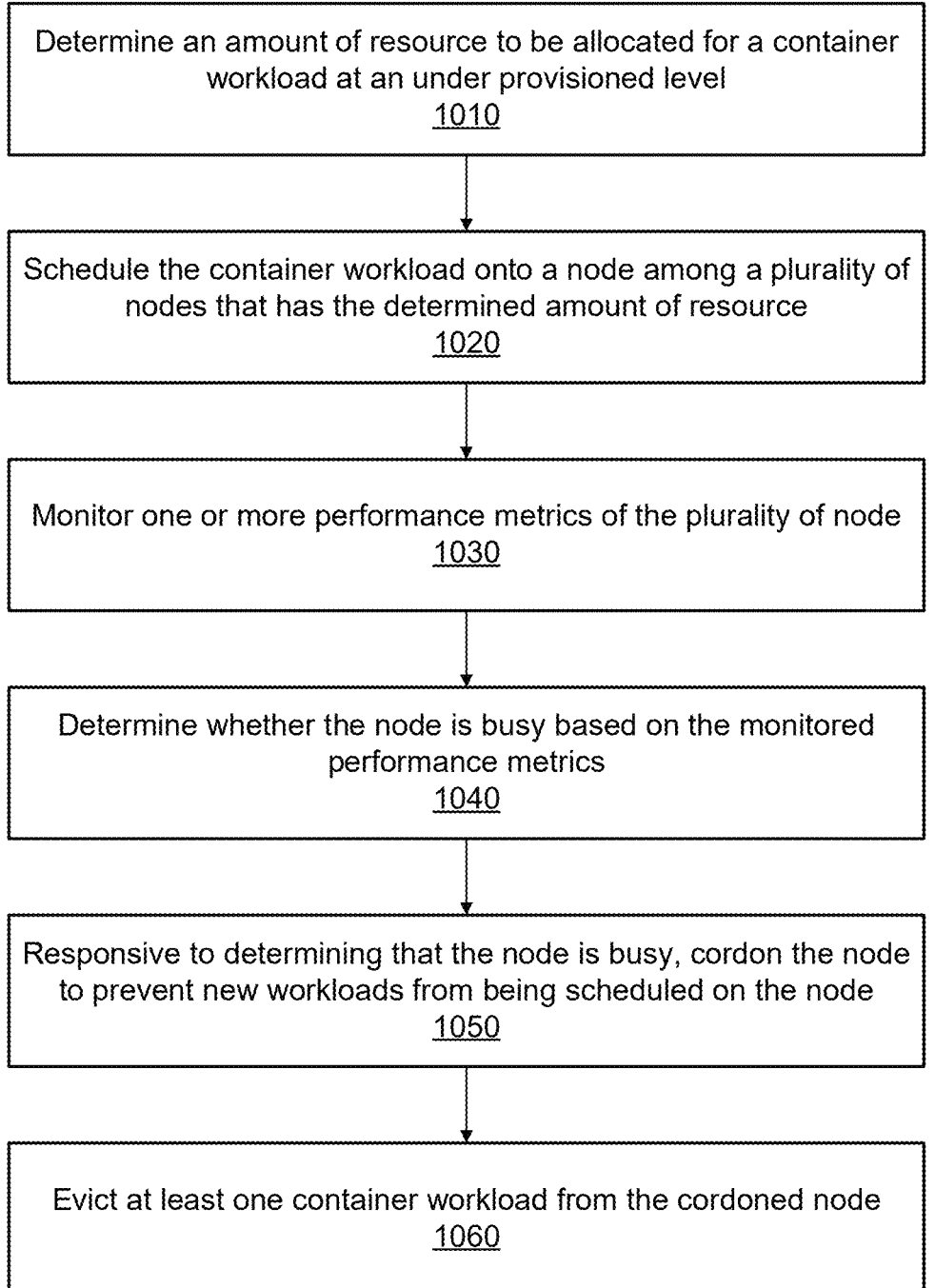

Determine an amount of resource to be allocated for a container workload at an under provisioned level
1010

Schedule the container workload onto a node among a plurality of nodes that has the determined amount of resource
1020

Monitor one or more performance metrics of the plurality of node
1030

Determine whether the node is busy based on the monitored performance metrics
1040

Responsive to determining that the node is busy, cordon the node to prevent new workloads from being scheduled on the node
1050

Evict at least one container workload from the cordoned node
1060

FIG. 10

UNDERPROVISIONING IN CONTAINERIZED ENVIRONMENTS

CROSS REFERENCE TO RELATED APPLICATION

This application claims priority to U.S. Provisional Patent Application Ser. No. 63/681,519, filed Aug. 9, 2024, U.S. Provisional Patent Application Ser. No. 63/688,979, filed Aug. 30, 2024, and U.S. Provisional Patent Application Ser. No. 63/693,521, filed Sep. 11, 2024, each of which is incorporated herein by reference in its entirety.

TECHNICAL FIELD

This disclosure relates generally to cloud computing, and more specifically automating resource allocation and workload management.

BACKGROUND

In a cloud computing environment, applications may be packaged into containers, which are deployed on virtual machines (also referred to as nodes). The runtime instance of a container that executes parts of the application is also referred to as a container workload. For example, an application may be deployed as multiple container workloads, including a frontend container workload that handles a user interface, a backend container workload that manages data processing, and a database container workload that stores and retrieves user data.

Different container workloads have varying resource requirements. For example, some workloads might require more CPU and memory resources during peak usage period, such as business hours, while needing far fewer resources during off-peak hours or periods of low activity. To manage this variability, resource allocation is typically pre-planned using conservative strategies based on high-percentile utilization metrics, such as the 80th or 90th percentile.

This approach means that resources, including CPU, memory, and storage, are reserved at levels sufficient to handle peak demand scenarios that may only occur sporadically or for short durations. While this conservative planning ensures that resources are available to handle the occasional spikes, it comes at a significant disadvantages: during normal operation, when workloads operate below their reserved capacities, a substantial portion of these resources remains idle.

SUMMARY

The present disclosure relates to a method and/or a system for optimizing resource allocation in a cloud computing environment, such as Kubernetes clusters. The disclosed method improves resource efficiency by allocating resources to container workloads at an under-provisioned level, determined based on historical usage patterns, such as below a predetermined percentile of resource demand. Unlike traditional conservative resource allocation approaches, this method dynamically adjusts resource allocation to reduce over-provisioning and idle resource wastage.

The method includes scheduling container workloads onto nodes with sufficient allocated resources and continuously monitoring performance metrics, such as CPU usage, memory usage, input/output (I/O) utilization, and Pressure Stall Information (PSI) metrics. PSI metrics provide insights into resource contention by quantifying the time workloads experience partial or full stalls due to resource constraints. By analyzing these metrics, the system determines whether a node is busy based on predefined thresholds for contention levels over specific time windows.

When a node is determined to be busy, the method implements cordoning by updating the node's metadata to prevent scheduling of new workloads while allowing existing workloads to continue. To alleviate resource contention, at least one workload is evicted from the cordoned node. Eviction decisions consider factors such as resource consumption, workload priority, and Quality of Service (QoS) classification, ensuring minimal disruption to critical operations. The evicted workload may be migrated to another node with sufficient resources or, if all nodes are busy or lack sufficient capacity, to a newly provisioned node generated by an autoscale function.

The method leverages dynamic scaling capabilities, including triggering the autoscale function to provision additional nodes during high demand and consolidating workloads during low demand. This approach ensures optimal resource utilization, reduces operational costs, and maintains application performance by mitigating the effects of resource contention through real-time monitoring and intelligent workload redistribution.

BRIEF DESCRIPTION OF THE DRAWINGS

FIG. 3 illustrates example code for extracting performance metrics (e.g., PSI) from a Kubernetes environment in accordance with one or more embodiments.

FIG. 8 illustrates an example GUI that provides an overview of the resource utilization for Kubernetes nodes and pods within a cluster, in accordance with one or more embodiments.

FIG. 9 illustrates an example GUI that displays a node list for managing and monitoring Kubernetes nodes, in accordance with one or more embodiments.

FIG. 10 illustrates a flowchart of an example method for allocating resource for container workloads, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

The process for resource allocation for workloads in a cloud computing environment, such as a Kubernetes environment often includes pre-planning resource allocation, and setting minimum (requested) and/or maximum (limit) CPU requirements for workloads. Existing methods often allocate resources at a default utilization percentage, such as 80P (80$^{th}$ percentile of maximum utilization) or 90P. However, this can lead to over-allocation, as workloads often operate below their requested capacity, resulting in wasted resources.

The embodiments described herein solve the above problem by initially setting a lower percentile of resource allocation (e.g., 30P) rather than a higher, conservative estimate (e.g., 80P), and shifting resource allocation decisions from the planning phase to the runtime phase, dynamically adjusting resource allocation based on real-time metrics. This allows for more workloads to be packed onto a node, thereby utilizing the available CPU resources more efficiently.

When a node is busy, workloads on the node spike and begin to compete for CPU resources. When this happens, the system prevents new workloads from being scheduled on it, and/or evicts one or more workloads (referred to as "victims") to another node or a newly created one. To determine whether a node is busy, the system monitors performance metrics, including a real time metric called pressure stall information (PSI).

In response to determining that a node is busy based on its PSI metrics, the system cordons the node. The term "cordon", as used herein, may refer to a process in a cloud computing environment (such as Kubernetes) where a node is marked as unschedulable, that is no new workload can be scheduled or deployed onto the node, while existing workloads or pods already running on the node can continue to operate normally. When a node is cordoned, it is marked as unscheduled, meaning no new workloads can be scheduled or deployed to that node. In some embodiments, the existing workloads or pods already running on the cordoned node will continue to operate normally. Alternatively, when a workload on a cordoned node needs to be scaled up, the system may evict the workload from the cordoned node, and moves that workload to a different node that is not cordoned, or creates a new node for the workload.

Figure 1:
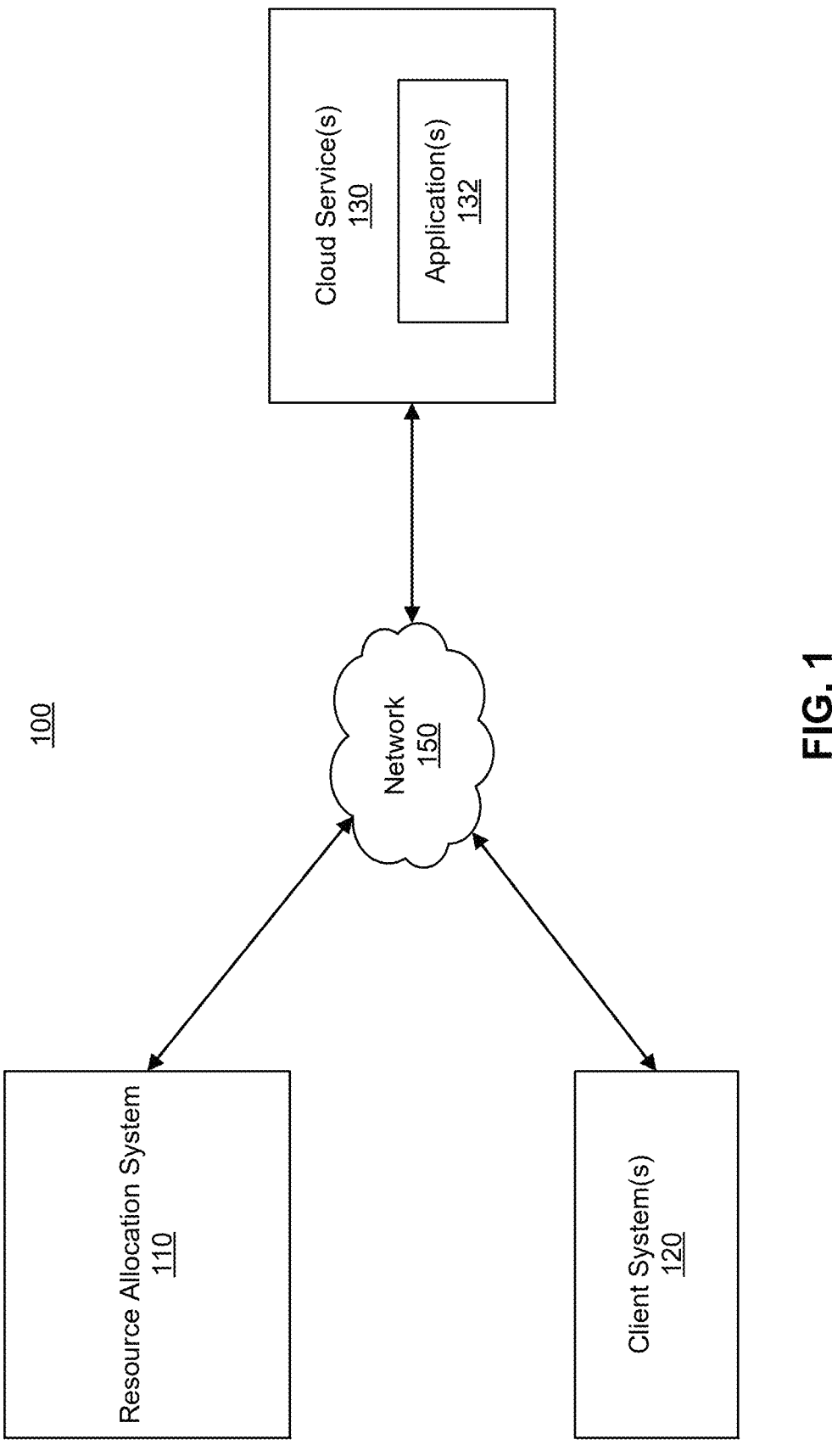
FIG. 1 is a block diagram of a system environment in which a resource allocation system 110 may be implemented, in accordance with one or more embodiments.

Additional details about the resource allocation system are further described below with respect to FIGS. 1-10.
System Architecture FIG. 1 is a block diagram of a system environment 100 in which a resource allocation system 110 may be implemented, in accordance with one or more embodiments. The environment 100 includes the resource allocation system 110, one or more client systems 120, and one or more cloud service(s) 130, interconnected via a network 150. The cloud service(s) 130 host one or more application(s) 132.

The cloud service(s) 130 provides a variety of instance families (e.g., virtual machines) to accommodate different computing needs of these applications 132. The cloud service provider (CSP) may be (but is not limited to) Amazon Web Service (AWS), Microsoft Azure, and Google Cloud Platform (GCP). The applications 132 may be packaged into containers, which are deployed onto virtual machines (also referred to as nodes). A collection of nodes (e.g., virtual machines) that work together to run and manage containerized applications form a cluster. Kubernetes is a container orchestration platform configured to automate the deployment, scaling and management of containerized applications. Additional details about clusters and Kubernetes services are described in U.S. patent application Ser. No. 17/380,729, filed Jul. 20, 2021 (now issued as U.S. Pat. No. 11,595,306), the disclosure of which is hereby incorporated by reference herein in its entirety.

The client system(s) 120 are computing systems associated with various entities. These entities include entities that can modify or deploy the applications 132 on the cloud service 130, as well as end-users who engage with these applications 132.

The resource allocation system 110 is configured to allocate resources for one or more container workloads at an under-provisioned level. The client system 120 may send an instruction to the resource allocation system 110 that a target application is to be deployed on one or more nodes in the cloud service 130 as one or more container workloads. The resource allocation system 110 allocates resources for the one or more container workloads at an under-provisioned level. The under-provisioned level may be determined based on a predicted peak demand of the one or more container workloads. For example, the under-provisioned level may be a level below a predetermined percentile of the predicted peak demand of the one or more container workloads, such as 50% or 30%. Note, traditionally, conservative resource allocation methods are often employed, such as pre-planning based on high percentile utilization (e.g., 90$^{th}$ percentile). Unlike the traditional conservative resource allocation methods, the embodiments described herein employ an under-provisioned method, in which a much lower amount of resource is allocated to container workloads.

The resource allocation system 110 schedules the one or more container workloads onto one or more nodes that have the allocated resources. At the same time, the resource allocation system 110 monitors one or more performance metrics of these nodes, and determines whether any node is busy based on the monitored performance metrics. The one or more performance metrics may include (but are not limited to) pressure stall information (PSI), CPU usage, memory usage, and/or I/O usage.

PSI measures and quantifies the impact of resource contention on system performance. Specifically, PSI provides insights into how CPU, memory, and I/O resource bottlenecks cause latency spikes, and throughput losses, which could potentially lead to out-of-memory (OOM) that kills workloads. When multiple workloads compete for limited CPU, memory, or I/O resources, performance can degrade significantly. PSI measures the time during which these resources are insufficient to meet the demands of the workloads, leading to stalls in processing. PSI metrics include a percentage of time during which at least some tasks are stalled on the resource, a percentage of time during which all non-idle tasks are stalled simultaneously, meaning the resource is fully saturated and cannot progress any workload effectively. PSI metrics can track these metrics over different time windows, e.g., 10 seconds, 60 seconds, and 300 seconds, providing short-term, medium-term, and long-term trends. PSI metrics can also record a total absolute stall time in microseconds, allowing the detection of short, intense spikes in resource contention that may not significantly affect average metrics but could still disrupt performance.

Responsive to determining that a node is busy, the resource allocation system 110 cordons the node by modifying metadata associated with a state of the node to indicate a state where no new workloads can be scheduled on the node. In some embodiments, the resource allocation system 110 may also evict a container workload from the cordoned node.

Figure 2:
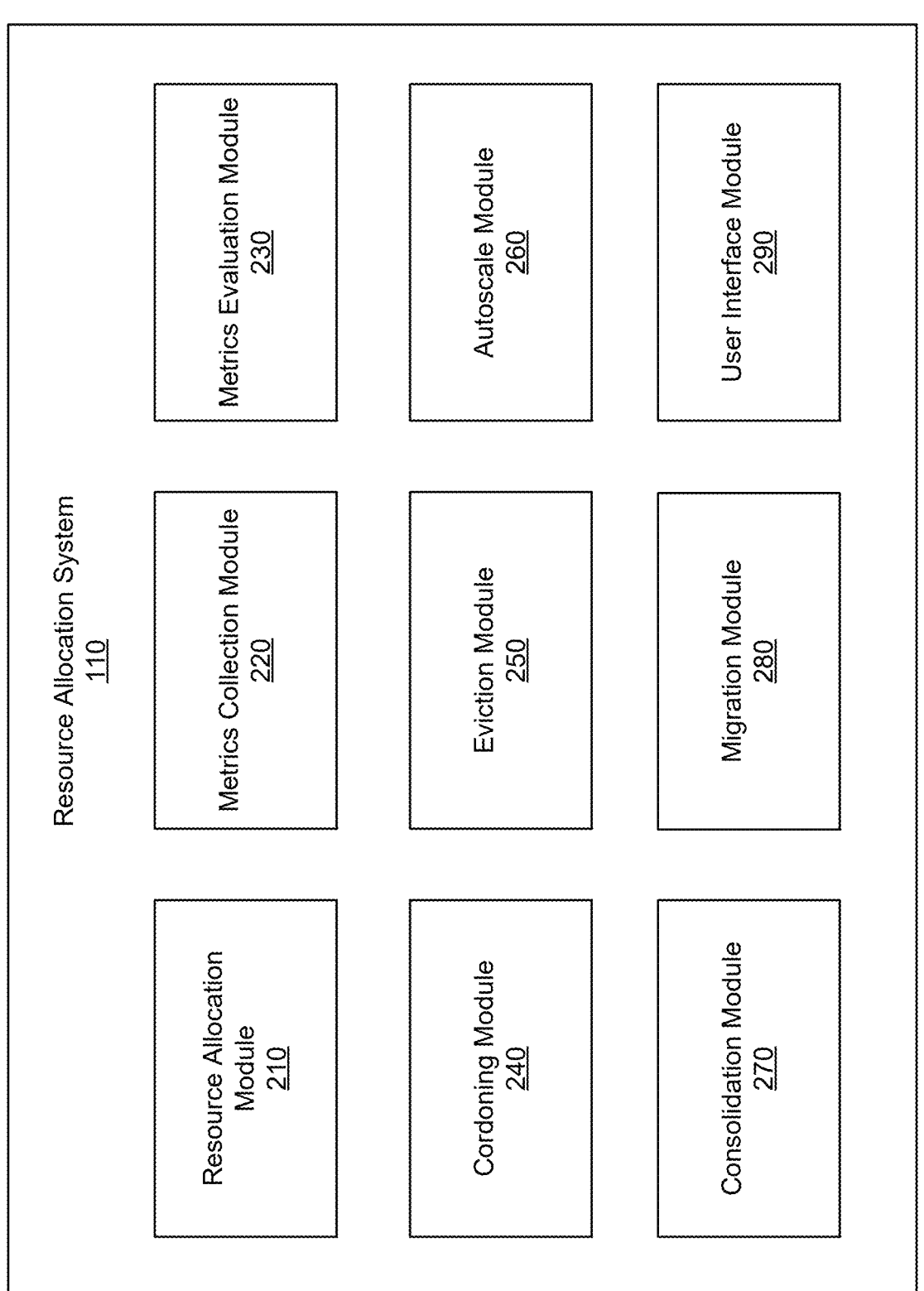
FIG. 2 illustrates an example architecture of a resource allocation system, in accordance with one or more embodiments.

FIG. 2 illustrates an example architecture of a resource allocation system 110, in accordance with one or more embodiments. The resource allocation system 110 includes a resource allocation module 210, a metrics collection module 220, a metrics evaluation module 230, a cordoning module 240, an eviction module 250, an autoscale module 260, a consolidation module 270, a migration module 280, and a user interface module 290.

Resource allocation module 210 is configured to determine an appropriate amount of resources to allocate to container workloads. The metrics collection module 220 is configured to gather performance metrics such as CPU usage, memory utilization, and pressure stall information (PSI) from nodes and workloads. The metrics evaluation module 230 is configured to analyze collected metrics to identify trends, determine resource demands, and evaluate node or workload performance. The cordoning module 240 is configured to mark a node as unschedulable when it becomes overloaded, preventing new workloads from being scheduled while allowing existing workloads to continue. The eviction module 250 is configured to select and remove workloads from overloaded nodes based on factors like resource consumption and priority, enabling redistribution to less busy nodes. The autoscale module 260 is configured to dynamically adjust computational resources by scaling nodes or workloads horizontally (adding/removing pods) or vertically (adjusting resource allocation for existing workloads). The consolidation module 270 is configured to consolidate workloads from underutilized nodes onto fewer nodes to optimize resource usage and free up unused nodes. The migration module 280 is configured to use live migration technology to move workloads between nodes seamlessly, ensuring minimal downtime during resource redistribution. The user interface module provides a platform for users to configure settings, view performance metrics, and track actions performed by the resource allocation system 110.

For example, the resource allocation module 210 first determines an amount of resource to be allocated to a container workload. In some embodiments, the resource allocation module 210 predicts a peak demand of a resource required for the container workload, and determine an amount of resource based on the predicted peak demand. Unlike traditional approach, where resource allocation is typically pre-planned using conservative high-percentile utilization metrics (e.g., $80^{th}$ or $90^{th}$ percentile), the resource allocation module 210 described herein determines an amount of resource at a much lower level, such as $50^{th}$ or $30^{th}$ percentile).

In some embodiments, the resource allocation module 210 conducts test runs of an application to simulate typical and peak workloads the application might experience in production. During test runs, the metrics collection module 220 collects metrics, such as CPU usage at regular intervals (e.g., every a few seconds or minutes). The metrics evaluation module 230 evaluates these metrics to determine a peak demand, $90^{th}$ percentile demand, $80^{th}$ percentile demand, $50^{th}$ percentile demand, and/or $30^{th}$ percentile demand, among others. The resource allocation module 210 can determine a resource allocation level based on the evaluated metrics.

The container workload is then scheduled onto one or more nodes that have the allocated resources. A node is a computing instance (e.g., a virtual machine) within a cluster that provides resources such as CPU, memory, storage, and network capabilities for running container workloads. Before scheduling a container workload, the system 110 may check whether a node in the cluster can meet the workload's resource requirements. In some embodiments, the system 110 maintains each node's resource status, including (but not limited to) total allocatable resources (e.g., CPU, memory, storage), utilized resources, and free resources. The system 110 assigns and schedules the container workload to a node that meets the determined resource requirements.

After the container workloads are scheduled onto nodes, the metrics collection module 220 continuously collects one or more performance metrics of those nodes, and the metrics evaluation module 230 continuously evaluates the collected performance metrics of those nodes to determine whether any node is busy based on the evaluation. The one or more performance metrics may include (but are not limited to) pressure stall information (PSI), CPU usage, memory usage, and/or I/O usage.

PSI measures and quantifies the impact of resource contention on system performance. Specifically, PSI provides insights into how CPU, memory, and I/O resource bottlenecks cause latency spikes, and throughput losses, which could potentially lead to out-of-memory (OOM) that kills workloads. When multiple workloads compete for limited CPU, memory, or I/O resources, performance can degrade significantly. PSI measures the time during which these resources are insufficient to meet the demands of the workloads, leading to stalls in processing. PSI metrics include a percentage of time during which at least some tasks are stalled on the resource, a percentage of time during which all non-idle tasks are stalled simultaneously, meaning the resource is fully saturated and cannot progress any workload effectively. PSI metrics can track these metrics over different time windows, e.g., 10 seconds, 60 seconds, and 300 seconds, providing short-term, medium-term, and long-term trends. PSI metrics can also record a total absolute stall time in microseconds, allowing the detection of short, intense spikes in resource contention that may not significantly affect average metrics but could still disrupt performance.

Responsive to determining that a node is busy or a performance metric of the node is worsened to a predetermined level, the cordoning module 240 cordons the node by modifying metadata associated with a state of the node to indicate a state where no new workloads can be scheduled on the node. Cordoning a node is a process to prevent any pods or workloads from being scheduled on that node while still allowing existing pods or workloads to run. In some embodiments, the cordoning module 240 marks the node as not schedulable. In some embodiments, the cordoning module 240 modifies the node's metadata associated with a state of the node. For example, the metadata may be set to a state indicating that no new pods can be scheduled on the node, while existing pods on the cordoned node continue to run as normal. The node only prevents new pods from being scheduled. If the node needs to be brought back into use, the node may be uncordoned, which reverses the cordoning action and allows pods to be scheduled on the node again.

In some embodiments, the resource allocation module 210 also determines which workload or pod is to be evicted. The determination may be based on various factors, including their performance metrics, their resource consumption, priority, and disruption cost to the services they are providing. For instance, workloads consuming more resources than they request might be chosen as candidates for eviction to relieve the pressure on the node. Once a workload is selected for eviction, the eviction module 250 sends a signal to the workload, initiating a shutdown process. If the workload doesn't shut down within a predetermined period, it may be forcefully terminated. On the other side, the resource allocation module 210 may place the evicted workload on another node that is not busy and with sufficient resources. The resource allocation module 210 may select one node from multiple candidate nodes based on their current states and available resources. In some embodiments, in response to determining that all nodes are busy or not have sufficient resources, the resource allocation module 210 triggers an autoscale function that causes the autoscale module 260 to automatically generate a new node and places the evicted pod on the new node.

In some embodiments, as part of the eviction and moving process, the resource allocation module 210 dynamically adjusts the CPU request for the evicted workload based on its real-time usage, allowing it to be allocated appropriate resources on the new node. This run-time adjustment ensures that workloads receive the necessary resources when they are under heavy load, and excess resources are reclaimed when the load decreases, thereby optimizing overall system efficiency.

Notably, resource utilization often fluctuates. For example, a web service might experience high traffic during the day time and lower traffic at night. In some embodiments, when resource utilization decreases across multiple nodes, the resource allocation module 210 causes the consolidation module 270 to consolidate workloads on these nodes into fewer nodes. This consolidation allows for some nodes to be freed up and removed, thereby conserving resources.

In some embodiments, the resource allocation module 210 integrates autoscale module 260 with eviction module 250 and/or consolidation module 270 to dynamically allocate resources. The autoscale module 260 may automatically adjust the amount of computational resources in a cloud environment based on workloads of nodes. There are primarily two types of autoscaling: horizontal and vertical. Horizontal autoscaling involves increasing or decreasing the number of workloads or pods in a pool in response to demand. This could mean more pods are added when demand is high and some pods are removed when demand is low. Vertical autoscaling involves increasing or decreasing the resources within a single workload or pod. This could mean adding or removing more CPU power, memory, or storage to an existing pod, rather than adding more pods.

In some embodiments, autoscale may include functions that automatically causes cordoning module 240 to cordon or uncordon a node based on its resource utilization. For example, a cordoned node may become underutilized later, and the status of the node may be updated from "cordoned" to "ready." Alternatively, or in addition, autoscale module 260 may consolidate nodes based on their resource utilizations. When multiple nodes are underutilized, the autoscale module 260 may consolidate workloads on these nodes into fewer nodes.

In some embodiments, the migration module 280 employs live migration technology to move workloads between nodes without downtime. Live migration technology may include memory state synchronization and/or disk state synchronization between a source and target workload or pod. Changes to the pod's state are tracked and continuously replicated to the target until the switch can be made. The actual switchover from the source to the target workload can occur very rapidly, often in milliseconds, so that the downtime is imperceptible to users.

The user interface module 290 is configured to receive user configurations and present user performance metrics collected and evaluated, and actions suggested or performed by the various modules 210-280 for resource allocation.

FIG. 3 illustrates example code 300 for extracting performance metrics (e.g., PSI) from a Kubernetes environment in accordance with one or more embodiments. The code 300 includes a 'scrape_metrics ( )' function that extracts node-level PSI metrics for CPU, memory, and I/O resources from a pressure_file. The pressure_file records PSI metrics of a node. There may be multiple pressure files, one for each resource. For example, a first pressure file may be generated for collecting PSI metrics for CPU-related contention, a second pressure file may be generated for collecting PSI metrics for memory-related contention, and a third pressure file may be generated for collecting PSI metrics for I/O-related contention. These metrics are collected and updated in real time or near-real time by a kernel of an operating system (e.g., Linux kernel) based on the state of tasks running on the system and their interactions with resources like CPU, memory, and I/O. The kernel tracks tasks (processes or threads) and their states (e.g., running, waiting, stalled) for each resource, such as CPU, memory, and I/O. The kernel records how long tasks spend in a stalled state for each resource. These durations are aggregated into time windows (e.g., 10 seconds, 60 seconds, 300 seconds) and presented as average (avg10, avg60, avg300) and total stall time.

Since PSI metrics change continuously as workloads and resource demands fluctuate, it is more efficient to calculate the metrics on demand rather than periodically writing them to disk. A dedicated directory (e.g.,/proc/pressure directory) may be used to expose such kernel data structures and runtime information to user space. Pressure files, in this dedicated directory are not stored on disk but are generated dynamically by the kernel when accessed, and the directory exists only as long as the kernel is running.

As described above, each pressure file may contain metrics describing how often tasks were delayed due to insufficient resources. The format may be:

```
some avg10=5.00 avg60=10.00 avg300=15.00
    total=200000
```

```
full avg10=3.00 avg60=6.00 avg300=9.00
    total=150000
```

"Some" represents partial resource contention, e.g., some tasks experienced stalls due to contention, but not all tasks were stalled. "Full" represents full resource contention, where all non-idle tasks were stalled simultaneously due to resource unviability. The metrics include avg10 (indicating average percentage of time over the last 10 seconds during which contention occurred), avg60 (indicating average percentage of time over the last 60 seconds during which contention occurred), avg300 (indicating average percentage of time over the last 300 seconds during which contention occurred), and total (indicating a total time in microseconds that tasks have been stalled since the system started).

For example, CPU PSI full avg10=50 may indicate that, on average, 50% of the time in the last 10 seconds, all non-idle tasks were stalled due to a lack of available CPU cycles. In other words, during the past 10 seconds, half of the time (50%) was spent in a state where all tasks requiring the CPU were stalled simultaneously due to insufficient CPU resources. This level of contention indicates severe overload on the CPU, as no task was able to progress for 50% of the time. Such high CPU contention would cause significant performance degradation for applications running on the node. Tasks may experience long delays, response times will increase, and some workloads may even fail if this condition persists.

The code 300 may be implemented at the metric collection module 220 for collecting PSI for each node. In some embodiments, the metric collection module 220 accesses the PSI file at a predetermined frequency, e.g., every several seconds, every minute, every several minutes. Alternatively, the metric collection module 220 may access the PSI file in response to determining resource usage is greater than a predetermined threshold. For example, in response to determining that CPU usage is greater than 80%, the metric collection module 220 is caused to access CPU PSI file to check CPU contention data.

After the PSI data is collected, the metrics evaluation module 230 may evaluate the PSI data to determine whether a node is busy. For example, if CPU PSI data indicates that the full avg10 (average percentage of time all tasks were stalled in the last 10 seconds) exceeds 30%, the node may be deemed as busy, because high CPU contention indicates the node is overloaded, and workloads are unable to progress. As another example, if memory PSI data indicates that some avg60 (average percentage of time some tasks were stalled due to memory contention in the last 60 seconds) exceeds 20%, the node may also be marked as busy because even partial memory contention suggests the node is struggling to handle workload demands.

In some embodiments, the metrics evaluation module 230 may perform comprehensive performance evaluations to combine multiple metrics to determine node busyness. For example, a node may be considered busy if CPU usage exceeds 85%, memory usage exceeds 90% and PSI metrics for CPU or memory show full avg10>30%.

Example Graphical User Interfaces (GUIs)

Figure 4:
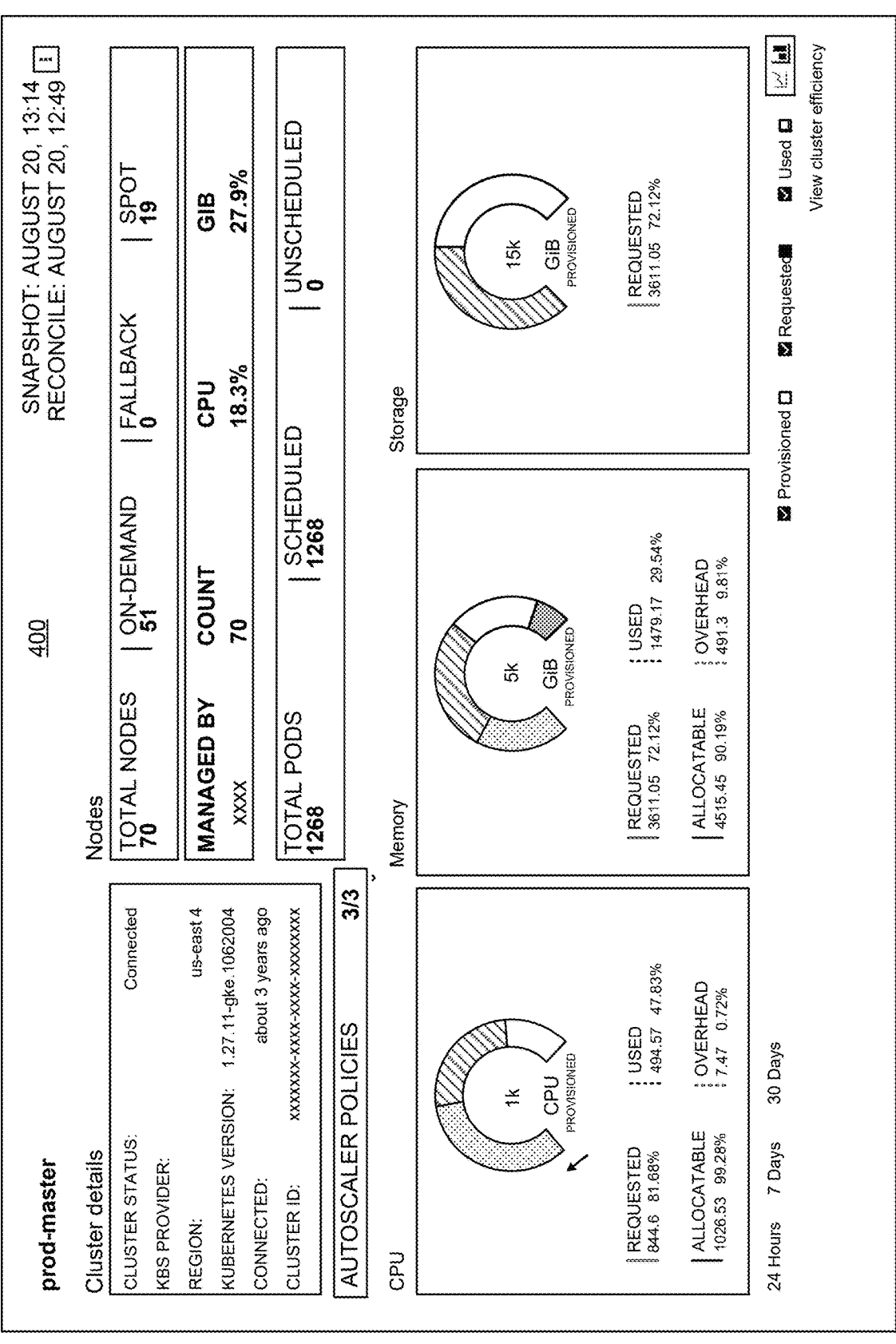
FIG. 4 illustrates an example graphical user interface (GUI) of a cloud-based Kubernetes management platform in accordance with one or more embodiments.

FIG. 4 illustrates an example graphical user interface (GUI) 400 of a cloud-based Kubernetes management platform in accordance with one or more embodiments. The GUI 400 is a dashboard for managing and monitoring a Kubernetes cluster, named "prod-master." As shown on the GUI 400, the cluster includes 70 nodes, among which 51 are on-demand nodes and 19 are spot nodes. On-demand nodes are compute instances (e.g., virtual machines) that are provisioned at a fixed hourly or per-second rate. These nodes are always available when requested, and their lifecycle is fully controlled by the user or the cluster. Spot nodes are compute instances that leverage spare capacity in the cloud provider's infrastructure. They can be reclaimed at any time when demand for regular (on-demand) instances increases. A total number of pods running in the cluster is 1268. A number of pods successfully scheduled onto nodes is 1268, and a number of unscheduled pods is 0.

The GUI 400 also provides metrics and insights into the resource allocation, utilization, and efficiency of the cluster. Each resource type (e.g., CPU, memory, storage) is visualized with donut charts that represent three main categories, namely, provisioned, requested, and used. Provisioned indicates a total provisioned capacity for the resource. Requested indicates an amount of the resource requested by workloads (e.g., pods). Used indicates the actual amount of the resource consumed by workloads. As illustrated, for CPU, 1K CPU units are provisioned, 844.6 units (81.88%) are requested, 494.57 (47.83%) units are consumed, and 7.47 units (0.72%) is overhead, representing system-level resource consumption. For memory, 5K GiB of memory is provisioned, 3811.05 GiB (72.12%) is requested, 1479.17

GiB (29.5%) is consumed, and 491.3 GiB (9.81%) is overhead, representing memory reserved for system operations. For storage, 15k GiB of storage is provisioned, and 3811.05 GiB (72.12%) is requested.

Figure 5:
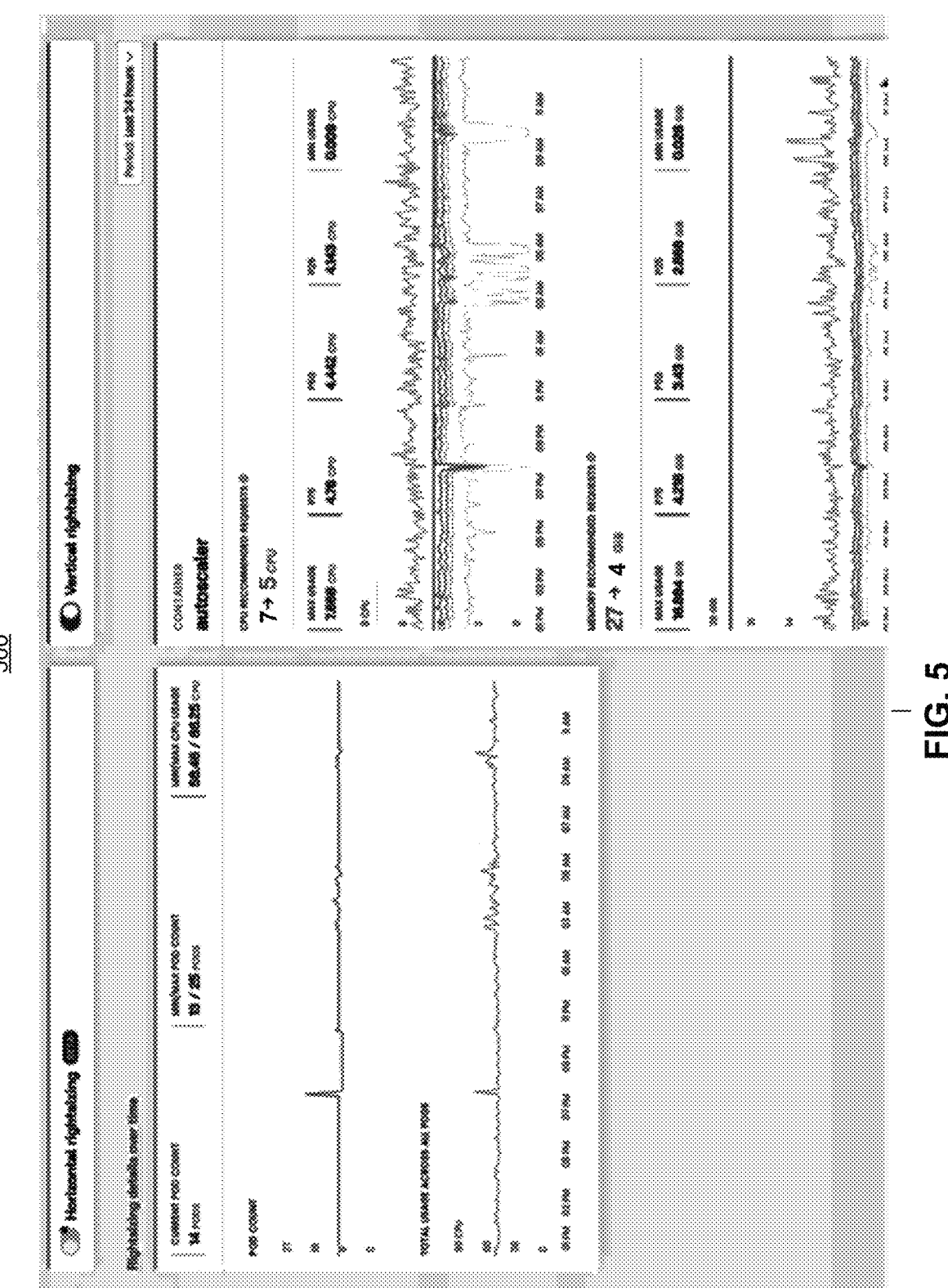
FIG. 5 illustrates an example GUI of a Kubernetes cluster management tool in accordance with one or more embodiments.

FIG. 5 illustrates an example GUI 500 of a Kubernetes cluster management tool in accordance with one or more embodiments. The GUI 500 may be part of a monitoring and resource management dashboard that provides insights into horizontal and vertical resource allocation for pods and containers over a specific time period (e.g., the last 23 hours).

The left side of the GUI shows graphs of pod count over time and total CPU usage across all pods. The current number of running pods is 14 pods, a minimum and maximum number of pods over the observed period is 13 to 25 pods, and a minimum and maximum CPU usage across all pods during the observed period is 58.46 to 86.25 CPUs. A first time-series graph shows fluctuations in the number of pods over the observed period. A second time series graph shows total CPU usage for all pods over time. These time series graphs allow users to observe resource consumption trends, spikes, and idle periods. Based on these time series graphs, the variability of CPU usage and number of pods suggests that workloads are not consistent, with a few short peak periods requiring significantly more resources.

The right side of the GUI provides recommendations for the CPU and memory resources for a specific container (e.g., "autoscaler" container). Recommended CPU request shows the current recommendation to reduce the CPU allocation from 7 to 5 CPUs. A maximum CPU usage is 7.686 CPUs; $75^{th}$ percentile (P75) usage is 4.876 CPUs; $50^{th}$ percentile (P50) usage is 4.442 CPUs, and $25^{th}$ percentile (P25) usage is 4.134 CPUs, and minimum CPU usage is 0.009 CPUs. A time series graph associated with CPU usage is shown.

Recommended memory request shows that the memory allocation recommendation to reduce memory allocation from 27 GiB to 4 GiB. A maximum memory usage is 18.864 GiB; $75^{th}$ percentile (P75) usage is 4.218 GiB; $50^{th}$ percentile (P50) usage is 3.343 GiB; $25^{th}$ percentile (P25) usage is 2.866 GiB; and minimum memory usage is 0.028 GiB. A time series graph associated with memory usage is also shown.

As described above, the metrics collection module 220 gathers resource usage metrics, and the metrics evaluation module 230 analyzes the collected data. Using these evaluated metrics, the resource allocation module 210 determines the appropriate amount of resources (e.g., CPU or memory) to allocate. In some embodiments, the resource allocation module 210 provides these recommendations to users.

In the example shown in GUI 500, the resource allocation module 210 recommends 5 CPUs and 4 GiB of memory. For CPU allocation, the module balances peak and typical usage patterns, where the maximum CPU usage is 7.686 CPUs, and the median (P50) usage is 4.442 CPUs, representing typical demand. The recommendation of 5 CPUs is based on P50 usage but also accounts for the P75 value of 4.876 CPUs, which is close to the median. Importantly, as seen in the graph on the left, allocating resources based on the maximum usage (7.686 CPUs) would lead to frequent underutilization, as CPU usage is below this level most of the time. The recommendation aligns with dynamic workloads, avoiding resource waste during idle or low-demand periods.

For memory allocation, the resource allocation module 210 has determined that allocating 27 GiB is inefficient, given that the maximum observed usage is 18.864 GiB. The P50 value of 3.43 GiB reflects typical memory requirements, and the recommended allocation of 4 GiB aligns with this value. This approach reduces waste while ensuring sufficient resources to meet most demands.

Figure 6:
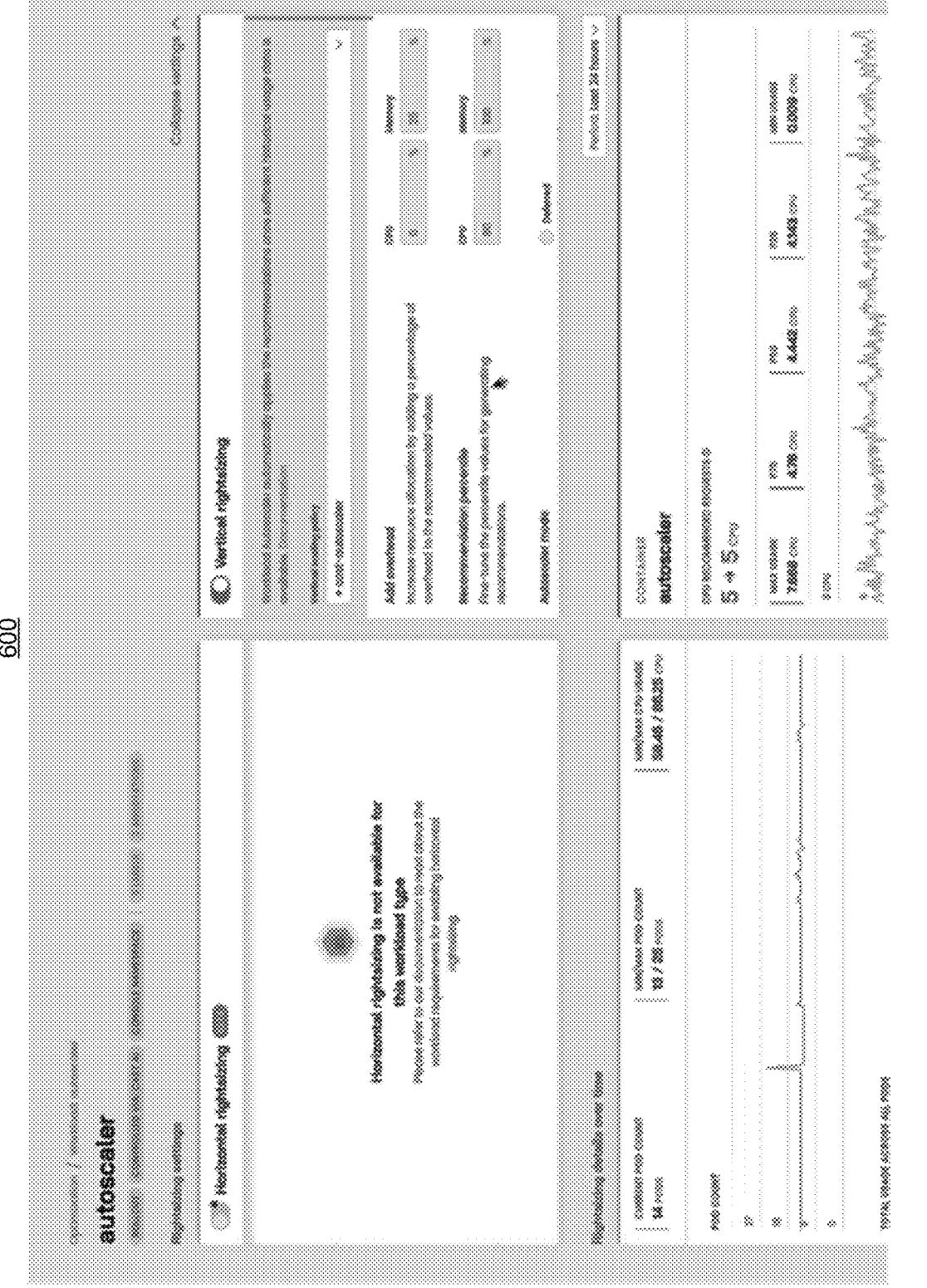
FIG. 6 illustrates an example GUI of configuration and monitoring settings for a Kubernetes container in accordance with one or more embodiments.

FIG. 6 illustrates an example GUI 600 of configuration and monitoring settings for an autoscaler (which corresponds to the autoscale module 260) in accordance with one or more embodiments. On the right side, a user can enable/disable vertical rightsizing features, select a vertical scaling policy, and/or add overhead. Based on the user's selection, the system recommends a percentile of CPU and memory allocation, e.g., 80% for CPU, and 100% for memory. Users can add overhead, which is a percentage buffer to the recommended resource allocations for CPU or memory. As shown on GUI 600, CPU overhead is 0 (indicating no buffer added), and memory overhead is 25% (indicating a 25% buffer is added to the memory recommendation).

The user can also enable autoscaler mode or choose "deferred." If autoscaler mode is enabled, the autoscaler automatically scales up or down based on resource usage of the node. If "deferred" is selected, any changes recommended by the autoscaler may not be applied immediately but rather deferred to a later time.

In some embodiments, when the autoscaler mode is enabled, the autoscaler may also automatically scale up or down based on PSI metrics. For example, the autoscaler may be configured with additional thresholds for PSI metrics that define when the node is considered busy or under pressure. For example, for CPU, full avg10>50%, for memory, some avg60>20%, and/or for I/O, total stall time exceeds 1 second per minute may be set as thresholds for autoscaler to automatically scale up. In response to determining that PSI metrics exceed one or more of these thresholds, the autoscaler may scale up by adding nodes (horizontal scaling) or increasing resources for existing nodes (vertical scaling). On the other hand, when PSI metrics indicate reduced contention (below predetermined thresholds), the autoscaler scales down by consolidating workloads and/or deallocating resources. In some embodiments, the threshold for scaling up and the thresholds for scaling down are different thresholds. For example, for CPU, full avg10<20%, for memory, some avg60<10%, and/or for I/O, total stall time no greater than 0.25 second per minute may be set as thresholds for autoscaler to automatically scale down.

In some embodiments, the autoscaler determines whether to scale up or down based on a combination of resource utilization and PSI metrics. For example, in some embodiments, the autoscaler detects that a node's CPU utilization has reached 85%, indicating that the system is operating near its capacity. Simultaneously, PSI metrics indicate high contention, with a CPU Full avg10 value of 60%, showing that for 60% of the last 10 seconds, all tasks on the CPU were stalled, and a CPU Some avg60 value of 40%, indicating partial stalls over the last minute. These metrics collectively signal that workloads on the node are facing significant performance degradation due to resource contention. The autoscaler responds by scaling up the cluster, either by provisioning additional nodes to redistribute workloads or by increasing the CPU allocation for affected workloads. This action reduces contention, ensures smoother task execution, and prevents further performance issues.

As another example, the autoscaler determines that a node's CPU utilization is at a moderate level of 70%, which could suggest a need for additional resources under certain conditions. However, the PSI metrics indicate minimal contention, with a CPU Full avg10 value of 0% (no complete stalls) and a CPU Some avg60 value of only 5% (minor partial stalls over the last minute). These metrics confirm that workloads are progressing smoothly without significant delays or contention, despite the moderate CPU usage. Based on this data, the autoscaler decides not to scale up, recognizing that the current resource allocation is sufficient to handle the workload. This decision prevents unnecessary scaling, avoids over-provisioning, and ensures that resources are allocated efficiently while maintaining system performance.

A combination of resource utilization and PSI metrics may also be used to scale down. For example, in some embodiments, the autoscaler identifies that a node's memory utilization is consistently low, at just 30%. The corresponding PSI metrics confirm negligible contention, with a Memory Some avg300 value of 2% (minimal partial stalls over the last 5 minutes) and a Memory Full avg10 value of 0% (no severe stalls). These indicators suggest that the node is underutilized and that memory resources are being wasted. The autoscaler takes action by consolidating workloads onto fewer nodes and deprovisioning the underutilized node. This approach improves overall resource efficiency by freeing up idle resources, reducing operational costs, and maintaining performance without over-allocating memory.

Figure 7:
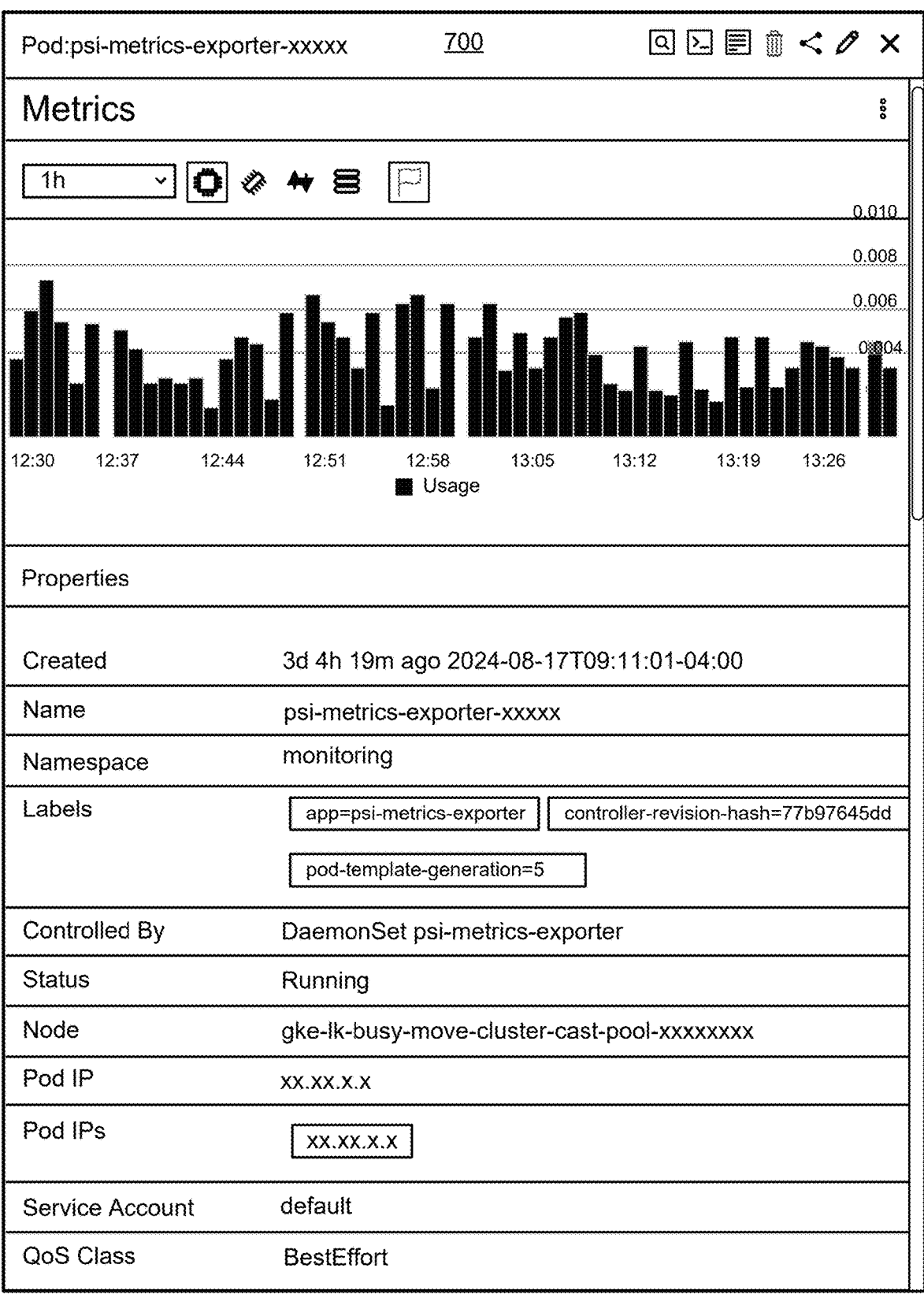
FIG. 7 illustrates an example GUI that provides PSI metrics in a Kubernetes cluster in accordance with one or more embodiments.

FIG. 7 illustrates an example GUI 700 that provides PSI metrics in a Kubernetes cluster in accordance with one or more embodiments. At the top of the GUI 700, a time-series graph displays real-time or historical PSI metrics, such as CPU or memory PSI. In some embodiments, each node in the cluster hosts a dedicated pod responsible for collecting PSI metrics for that specific node. GUI 700 presents a combination of real-time metrics and detailed metadata about the pod's configuration and operations. The properties panel in the GUI provides essential metadata and operational information, including the pod's creation time, unique identifier, namespace, labels (key-value pairs for identification and grouping), current status (e.g., running), the node on which the pod is running, the pod's internal IP address, the service account controlling the pod's permissions within the cluster, and the Quality of Service (QoS) class (e.g., Best-Effort, indicating no guaranteed resource reservations and potential deprioritization during contention), among other details.

The time-series graph helps administrators monitor a node's resource behavior in real time and diagnose performance issues or resource contention. Additionally, the resource allocation module 210 and autoscale module 260 can leverage the PSI metrics collected by the pod to make informed decisions regarding resource allocation and scaling. This integration of real-time monitoring with operational insights enhances the efficiency and responsiveness of resource management in the cluster.

FIG. 8 illustrates an example GUI 800 that provides an overview of the resource utilization for Kubernetes nodes and pods within a cluster, in accordance with one or more embodiments. The GUI 800 includes two sections, namely Kubernetes nodes utilization and pods. The Kubernetes nodes utilization section lists names of nodes in the Kubernetes cluster, CPU resources available on each node, memory capacity of each node, current operational state of each node, a total number of pods running on each node, and actual CPU usage for each node. As illustrated, nodes have varying CPU and memory capacities, with some showing high resource usage (e.g., 89% CPU usage) and others underutilized (e.g., 32% CPU). Nodes with higher pod counts (e.g., 32 pods) tend to have higher CPU usage, potentially indicating resource contention.

The pods section lists the names of the pods running in the cluster, Kubernetes namespace each pod belongs to, an amount of CPU resources requested by each pod, memory resources requested by each pod, and actual CPU usage percentage for each pod. As illustrated, some pods have high actual CPU usage relative to their CPU requests, suggesting potential under-provisioning (e.g., fluentbit-gke-xxxxx with 5m requested but 88% CPU usage).

Administrators can quickly identify nodes and pods with high resource usage, such as nodes nearing capacity or pods over utilizing CPU relative to their requests. High pod counts and CPU usage on certain nodes may indicate potential performance bottlenecks. The resource allocation module 210 and autoscale module 260 may also use this data to identify opportunities to rebalance workloads (e.g., move pods from heavily loaded nodes to underutilized ones). Pods with mismatched CPU requests and actual CPU usage (e.g., under-requesting or over-requesting resources) can also be identified and reconfigured for better resource efficiency.

Figure 9:
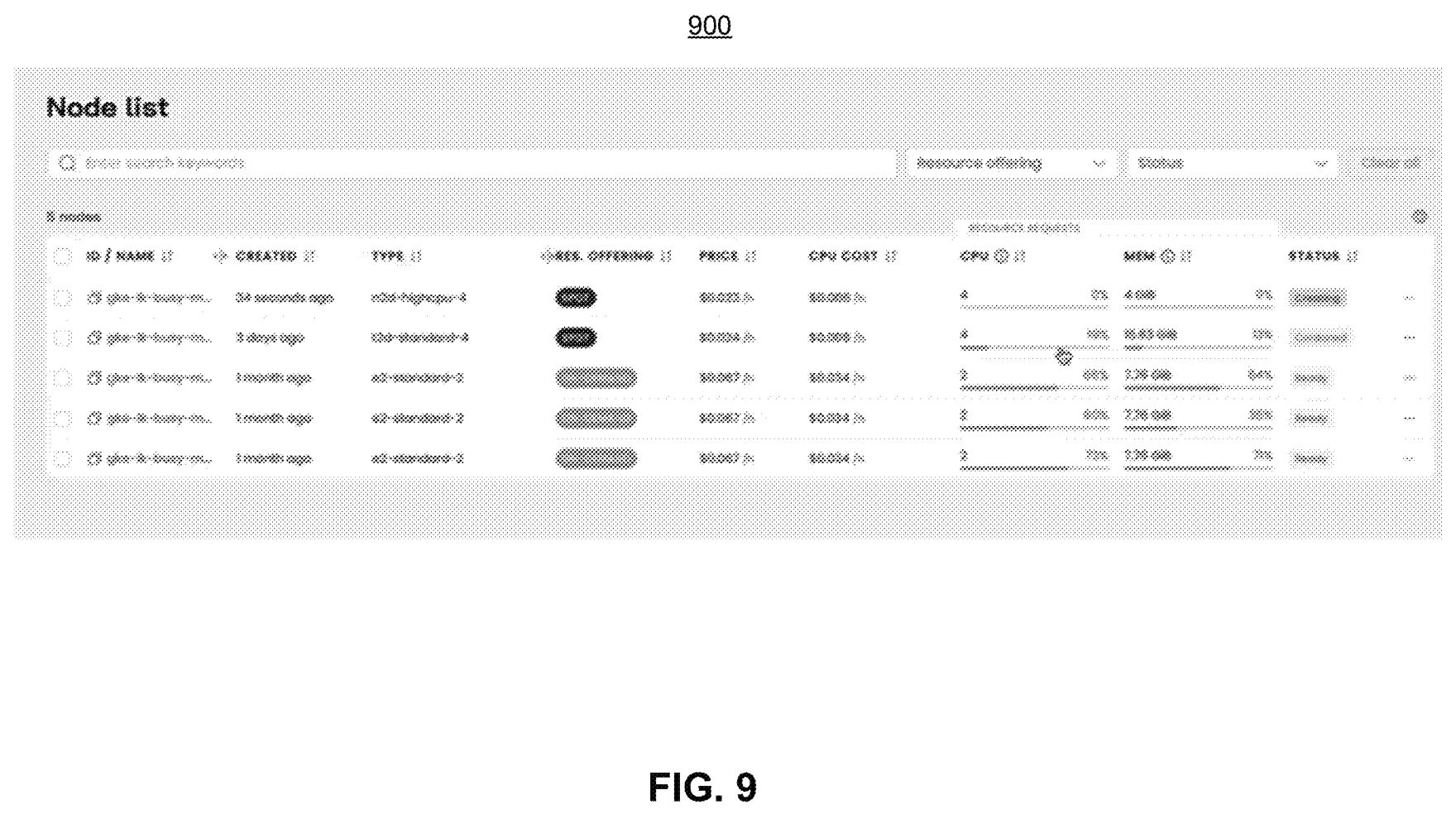

FIG. 9 illustrates an example GUI 900 that displays a node list for managing and monitoring Kubernetes nodes, in accordance with one or more embodiments. The node list includes details about node resources, such as name or identifier of each node, how long ago each node was created, an instance type for each node (e.g., n2d-highcpu-4, t3a-standard-4, e2-standard-2), whether the node is a spot instance or on-demand instance, hourly cost of running the node (e.g., $0.023/h), cost associated with the node's CPU usage per hour (e.g., $0.006/h), a progress bar visualizing the percentage of CPU resources currently being requested (e.g., 67%), another progress bar visualizing the percentage of memory currently being requested (e.g., 54%), CPU and memory values for each node, and operational state of each node (e.g., creating, cordoned, ready).

Resource allocation module 210 and autoscale module 260 can identify nodes with high resource usage (e.g., 100% CPU) or underutilized nodes (e.g., 0% CPU and memory usage) to optimize cluster performance. Administrators can also review the node list to manually adjust resource utilization and workloads assignments to each node.

Example Method for Allocating Resource for Container Workloads

FIG. 10 illustrates a flowchart of an example method 1000 for allocating resource for container workloads, in accordance with one or more embodiments. In various embodiments, the method includes different or additional steps than those described in conjunction with FIG. 10. Further, in some embodiments, the steps of the method may be performed in different orders than the order described in conjunction with FIG. 10. The method described in conjunction with FIG. 10 may be carried out by the resource allocation system 110 in various embodiments, while in other embodiments, the steps of the method are performed by any online system capable of performing these steps.

The resource allocation system 110 determines 1010 an amount of resource to be allocated for a container workload at an under provisioned level. In some embodiments, the resource allocation system 110 collects historical usage data and real-time metrics to understand workload behavior. Historical data, such as CPU memory, and I/O usage, may be gathered from past workloads or controlled test runs. These metrics are processed to calculate percentiles like the $30^{th}$, $50^{th}$, $75^{th}$, and $90^{th}$, which represent typical and peak resource usage scenarios. The resource allocation system 110 determines under-provisioned levels based on a predetermined percentile, such as the $30^{th}$ or $50^{th}$ percentile, instead of conservatively provisioning for maximum usage (e.g., $80^{th}$ or $90^{th}$ percentile). For example, if a workload typically requires 4 GiB of memory (P50) but occasionally spikes to 8 GiB (P90), the system 110 might allocate 4 or 5 GiB. This approach significantly reduces resource waste.

The resource allocation system 110 then schedules 1020 the container workload onto a node among a plurality of nodes that has the determined amount of resource. In some embodiments, the system 110 continuously tracks resource availability across all nodes in a cluster, including each node's total allocatable resources, current resource utilization, and free resources available for scheduling. The system 110 may also monitor additional metadata, such as node status (e.g., ready, cordoned), QoS class, labels, and taints/tolerations, among others. If multiple nodes meet the workload's requirements, the system 110 may prioritizes nodes based on a number of factors, such as resource utilization, node health and status, proximity to limits, etc. In responsive to identifying a suitable node, the resource allocation system 110 schedules the container workload onto the node.

After the workload is scheduled onto the node, the system 110 continuously monitors 1030 one or more performance metrics of the plurality of nodes. The one or more performance metrics include (but are not limited to) CPU utilization, which tracks the percentage of CPU resources in use, and PSI for CPU, memory, and I/O, which provides insights into resource contention by measuring the percentage of time tasks are stalled. Memory utilization captures the percentage of allocated memory being used, while memory PSI indicates delays caused by insufficient memory resources. Similarly, I/O utilization monitors throughput for storage and network resources, complemented by I/O PSI to detect bottlenecks. Additional metrics include the number of pods running on each node, their resource usage, and the node's overall allocatable and free resources. The system also tracks node-specific states (e.g., Ready, Cordoned), ensuring workloads are scheduled on nodes that are both operational and sufficiently resourced.

The system 110 determines 1040 whether the node is busy based on the monitored performance metrics. For instance, the node may have the following metrics: CPU utilization of 85%, memory utilization of 70%, CPU PSI full avg10=45% (indicating that for 45% of the last 10 seconds, all tasks on the CPU were stalled due to contention), memory PSI some avg60 (indicating partial memory stalls occurred during 30% of the last minute), pod count of 30. Based on these metrics, the system 110 determines whether the node is busy. The high CPU utilization and significant CPU PSI Full avg10 indicate that the node is experiencing contention for CPU resources, causing task delays and performance degradation. Additionally, the elevated Memory PSI Some avg60 suggests that memory contention is beginning to impact workloads. As a result, the system determines that the node is "busy" and takes appropriate action. For example, it may mark the node as cordoned, preventing new workloads from being scheduled on it, or trigger the eviction of one or more low-priority workloads to redistribute resource demand and alleviate contention. By using these performance metrics, the system ensures efficient resource management and maintains overall cluster performance.

Responsive to determining that the node is busy, the system 110 cordons 1050 the node to prevent new workloads from being scheduled on the node. In some embodiments, cordoning the node includes modifying the node's metadata to include a "cordoned" status. In some embodiments, cordoning the node includes setting an "unschedulable" flag in the node's specification, which indicates that no new workloads (e.g., pods) can be scheduled on the nodes. While new workloads are blocked, the existing workloads or pods running on the cordoned node continue to operate as normal.

In some embodiments, the system 110 also evicts 1060 at least one workload from the cordoned node. In some embodiments, the system 110 determines which workload to evict from a cordoned node by evaluating several factors related to resource usage, workload priority, and impact on the cluster for each workload running on the node. In some embodiments, workloads that consume significantly more resources than their original requests (e.g., over-utilizing CPU or memory) may be prioritized for eviction. For example, if a workload requested 1 CPU but is using 3 CPUs, it may become a candidate for eviction. In some embodiments, workloads are ranked based on their assigned priority levels, which indicate their importance to the overall system or application. workloads with lower priority (e.g., test or non-critical workloads) are more likely to be evicted than critical or high-priority workloads. Pods marked as critical or high priority are avoided unless no other options are available. In some embodiments quality of service (QoS) class assigned to each workload also influences eviction decisions. In some embodiments, workloads with a BestEffort QoS class (no guaranteed resource reservation) may be the first candidates for eviction. Workloads with a Guaranteed QoS class are evicted only as a last resort.

Example Computing System

Figure 11:
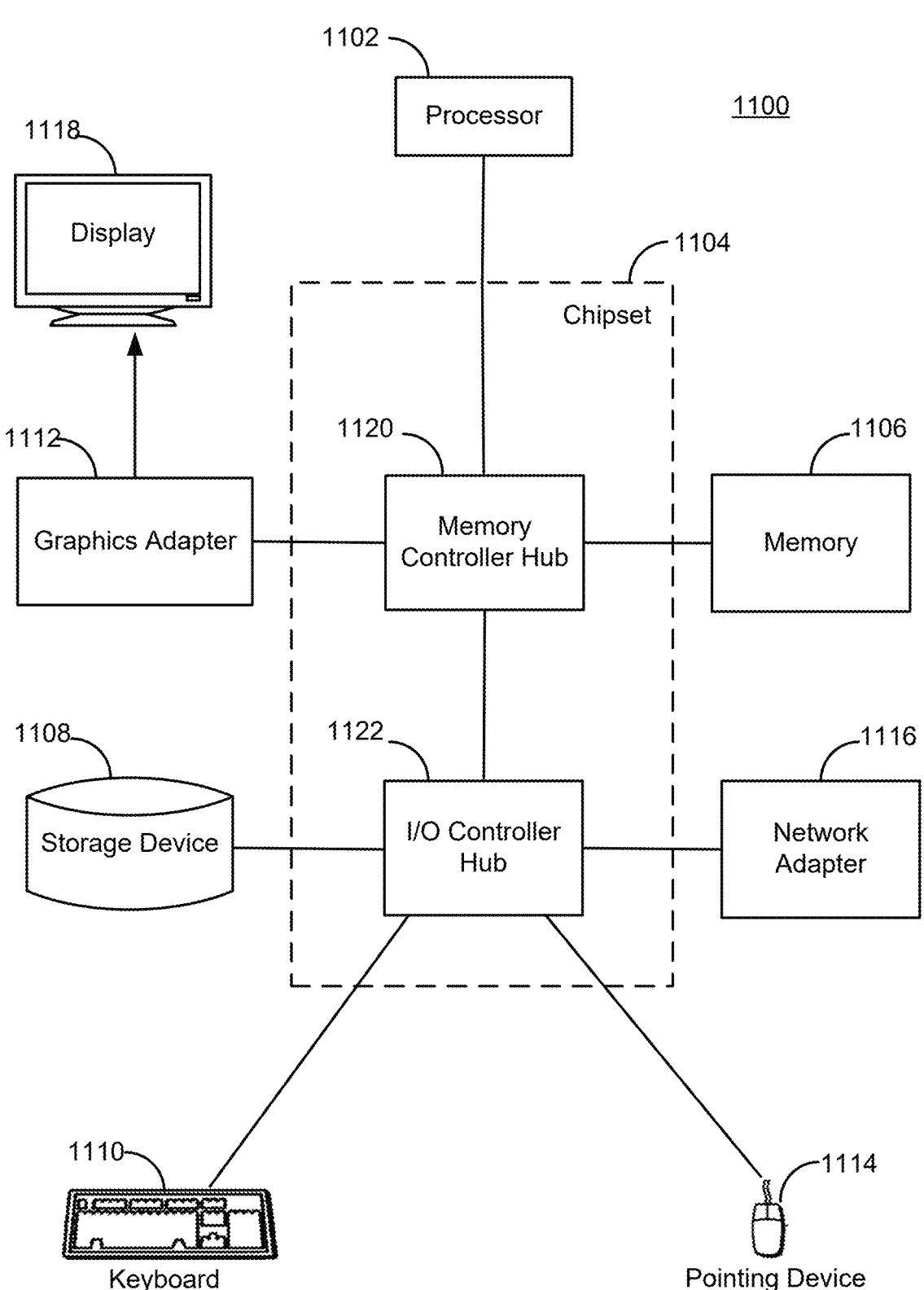
FIG. 11 is a block diagram of an example computer suitable for use in the networked computing environment of FIG. 1.

FIG. 11 is a block diagram of an example computer 1100 suitable for use in the networked computing environment 100 of FIG. 1. The computer 1100 is a computer system and is configured to perform specific functions as described herein. For example, the specific functions corresponding to resource allocation system 110 may be configured through the computer 1100.

The example computer 1100 includes a processor system having one or more processors 1102 coupled to a chipset 1104. The chipset 1104 includes a memory controller hub 1120 and an input/output (I/O) controller hub 1122. A memory system having one or more memories 1106 and a graphics adapter 1112 are coupled to the memory controller hub 1120, and a display 1118 is coupled to the graphics adapter 1112. A storage device 1108, keyboard 1110, pointing device 1114, and network adapter 1116 are coupled to the I/O controller hub 1122. Other embodiments of the computer 1100 have different architectures.

In the embodiment shown in FIG. 11, the storage device 1108 is a non-transitory computer-readable storage medium such as a hard drive, compact disk read-only memory (CD-ROM), DVD, or a solid-state memory device. The memory 1106 holds instructions and data used by the processor 1102. The pointing device 1114 is a mouse, track ball, touchscreen, or other types of a pointing device and may be used in combination with the keyboard 1110 (which may be an on-screen keyboard) to input data into the computer 1100. The graphics adapter 1112 displays images and other information on the display 1118. The network adapter 1116 couples the computer 1100 to one or more computer networks, such as network 150.

The types of computers used by the entities and the automation system 110 of FIGS. 1 through 10 can vary depending upon the embodiment and the processing power required by the enterprise. For example, the automation system 110 might include multiple blade servers working together to provide the functionality described. Furthermore, the computers can lack some of the components described above, such as keyboards 1110, graphics adapters 1112, and displays 1118.

Additional Considerations

The resource allocation system 110 described herein allocates resources at an under-provisioned level and dynamically adjusts workloads based on real-time demand, reducing both over-provisioning and idle resource wastage. This approach shifts resource allocation decisions from the pre-planning phase to the runtime system, enhancing flexibility and efficiency. By continuously monitoring performance metrics, including Pressure Stall Information (PSI), the system 110 detects resource contention early. It mitigates performance issues such as latency spikes and throughput losses by cordoning busy nodes and redistributing workloads through eviction or autoscaling. The integration of PSI-based autoscaling mechanisms allows the system to dynamically scale up or down, reducing cluster operational costs by deprovisioning underutilized nodes during periods of low demand and provisioning additional nodes only when necessary. Furthermore, the use of live migration technology ensures seamless workload redistribution with minimal downtime, maintaining application availability and minimizing service interruptions.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcodes, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium, which includes any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for optimizing resource allocation in a cloud computing environment, the method comprising:
   determining an amount of resource to be allocated for a container workload at an under-provisioned level;
   scheduling the container workload onto a node among a plurality of nodes that has the determined amount of resources;
   monitoring one or more performance metrics of the plurality of nodes,
   determining whether the node is busy based on the monitored performance metrics;
   responsive to determining that the node is busy, cordoning the node by directly modifying node specification metadata to set an unschedulable flag to indicate a state where no new workloads can be scheduled on the node while allowing existing workloads to continue operating;
   evicting at least one container workload from the cordoned node; and
   in response to determining that the node is no longer busy after cordoning by accessing performance metrics of the node following cordoning and determining resource usage is below a predetermined threshold, uncordoning the node by modifying the metadata associated with the state of the node to indicate a state that enables scheduling of new workloads on the node.

2. The method of claim 1, wherein the under-provisioned level is a level below a predetermined percentile of historical resource usage of container workloads.

3. The method of claim 1, wherein the method further comprises:
   migrating the evicted container workload to another node that is not busy and is with a sufficient resource.

4. The method of claim 1, wherein the method further comprises:
   responsive to determining that all nodes are busy, triggering an autoscale function to generate a new node; and
   migrating the evicted container workload to the new node.

5. The method of claim 1, wherein the performance metric of the one or more nodes comprises one or more pressure stall information (PSI) metrics associated with CPU, memory, or input/output.

6. The method of claim 5, wherein determining whether the node is busy includes:
   analyzing the one or more PSI metrics to determine whether a full or partial resource contention on the node over a predefined time window is greater than the predetermined threshold; and
   responsive to determining that the full or partial resource contention on the node over the predetermined time window is greater than the predetermined threshold, determining that the node is busy.

7. The method of claim 1, wherein evicting the at least one workload comprises:
   selecting the at least one workload from a plurality of workloads currently running on the node based on one or more of resource consumption, workload priority, and quality of service (QoS) classification.

8. The method of claim 1, the method further comprising:
   responsive to determining that all of the plurality of nodes lack sufficient resource or are busy,
   provisioning a new node; and
   migrating the evicted container workload to the new node.

9. A non-transitory storage medium having instructions encoded thereon that, when executed by one or more processors, cause the one or more processors to perform steps comprising:
   determining an amount of resource to be allocated for a container workload at an under-provisioned level;
   scheduling the container workload onto a node among a plurality of nodes that has the determined amount of resources;
   monitoring one or more performance metrics of the plurality of nodes,
   determining whether the node is busy based on the monitored performance metrics;
   responsive to determining that the node is busy, cordoning the node by directly modifying node specification metadata to set an unschedulable flag to indicate a state where no new workloads can be scheduled on the node while allowing existing workloads to continue operating;
   evicting at least one container workload from the cordoned node; and
   in response to determining that the node is no longer busy after cordoning by accessing performance metrics of the node following cordoning and determining resource usage is below a predetermined threshold, uncordoning the node by modifying the metadata associated with the state of the node to indicate a state that enables scheduling of new workloads on the node.

10. The non-transitory storage medium of claim 9, wherein the under-provisioned level is a level below a predetermined percentile of historical resource usage of container workloads.

11. The non-transitory storage medium of claim 9, wherein the steps further comprises:
   migrating the evicted container workload to another node that is not busy and is with a sufficient resource.

12. The non-transitory storage medium of claim 9, wherein the steps further comprises:
   responsive to determining that all nodes are busy, triggering an autoscale function to generate a new node; and
   migrating the evicted container workload to the new node.

13. The non-transitory storage medium of claim 9, wherein the performance metric of the one or more nodes comprises one or more pressure stall information (PSI) metrics associated with CPU, memory, or input/output.

14. The non-transitory storage medium of claim 13, wherein determining whether the node is busy includes:
   analyzing the one or more PSI metrics to determine whether a full or partial resource contention on the node over a predefined time window is greater than the predetermined threshold; and
   responsive to determining that the full or partial resource contention on the node over the predetermined time window is greater than the predetermined threshold, determining that the node is busy.

15. The non-transitory storage medium of claim 9, wherein evicting at least one workload comprises:

selecting the at least one workload from a plurality of workloads currently running on the node based on one or more of resource consumption, workload priority, and quality of service (QoS) classification.

16. The non-transitory storage medium of claim 9, the steps further comprising:

responsive to determining that all of the plurality of nodes lack sufficient resource or are busy, provisioning a new node; and migrating the evicted container workload to the new node.

17. A computing system comprising:

one or more processors; and a non-transitory storage medium having instructions encoded thereon that, when executed by one or more processors, cause the one or more processors to perform steps comprising:

determining an amount of resource to be allocated for a container workload at an under-provisioned level;

scheduling the container workload onto a node among a plurality of nodes that has the determined amount of resources;

monitoring one or more performance metrics of the plurality of nodes, determining whether the node is busy based on the monitored performance metrics;

responsive to determining that the node is busy, cordoning the node by directly modifying node specification metadata to set an unschedulable flag to indicate a state where no new workloads can be scheduled on the node while allowing existing workloads to continue operating;

evicting at least one container workload from the cordoned node; and in response to determining that the node is no longer busy after cordoning by accessing performance metrics of the node following cordoning and determining resource usage is below a predetermined threshold, uncordoning the node by modifying the metadata associated with the state of the node to indicate a state that enables scheduling of new workloads on the node.

18. The computing system of claim 17, wherein the under-provisioned level is a level below a predetermined percentile of historical resource usage of container workloads.

19. The computing system of claim 17, wherein the steps further comprise:

migrating the evicted container workload to another node that is not busy and is with a sufficient resource.

20. The computing system of claim 17, wherein the steps further comprise:

responsive to determining that all nodes are busy, triggering an autoscale function to generate a new node; and migrating the evicted container workload to the new node.

* * * * *